United States Patent

[11] 3,583,658

| [72] | Inventor | Jack E. Herweg<br>Arlington, Tex. |
|---|---|---|
| [21] | Appl. No. | 805,710 |
| [22] | Filed | Mar. 10, 1969 |
| [45] | Patented | June 8, 1971 |
| [73] | Assignee | A.R.A. Manufacturing Company,(Division of Texstar Corporation),<br>Arlington, Tex. |

[54] SINGLE-ENGINE AIRCRAFT AIR-CONDITIONING SYSTEM
14 Claims, 14 Drawing Figs.

[52] U.S. Cl. .................................................. 244/1,
248/14, 62/243, 244/59
[51] Int. Cl. ........................................................ B64d 13/08,
B64d 41/00
[50] Field of Search ....................................... 244/59, 1, 53;
62/239, 243, 244; 248/14, 3

[56] References Cited
UNITED STATES PATENTS

| 2,164,545 | 7/1939 | Rogers | 244/57 |
| 2,180,760 | 11/1939 | Mayo | 62/243 |
| 2,731,239 | 1/1956 | Andersen | 244/57 |
| 3,324,675 | 6/1967 | Mills | 244/59(X) |
| 3,326,503 | 6/1967 | Bade | 248/14 |

*Primary Examiner*—Milton Buchler
*Assistant Examiner*—James E. Pittenger
*Attorney*—Howard E. Moore

ABSTRACT: An air-conditioning system for single-engine aircraft having a condenser and compressor mounted in the fuselage forward of the center of gravity of the aircraft and an evaporator positioned behind the center of gravity so as to balance the craft about its longitudinal, horizontal and vertical axis without changing the center of gravity of the craft and without structural modification of the craft.

INVENTOR.
JACK E. HERWEG
BY
Howard E. Moore
ATTORNEY

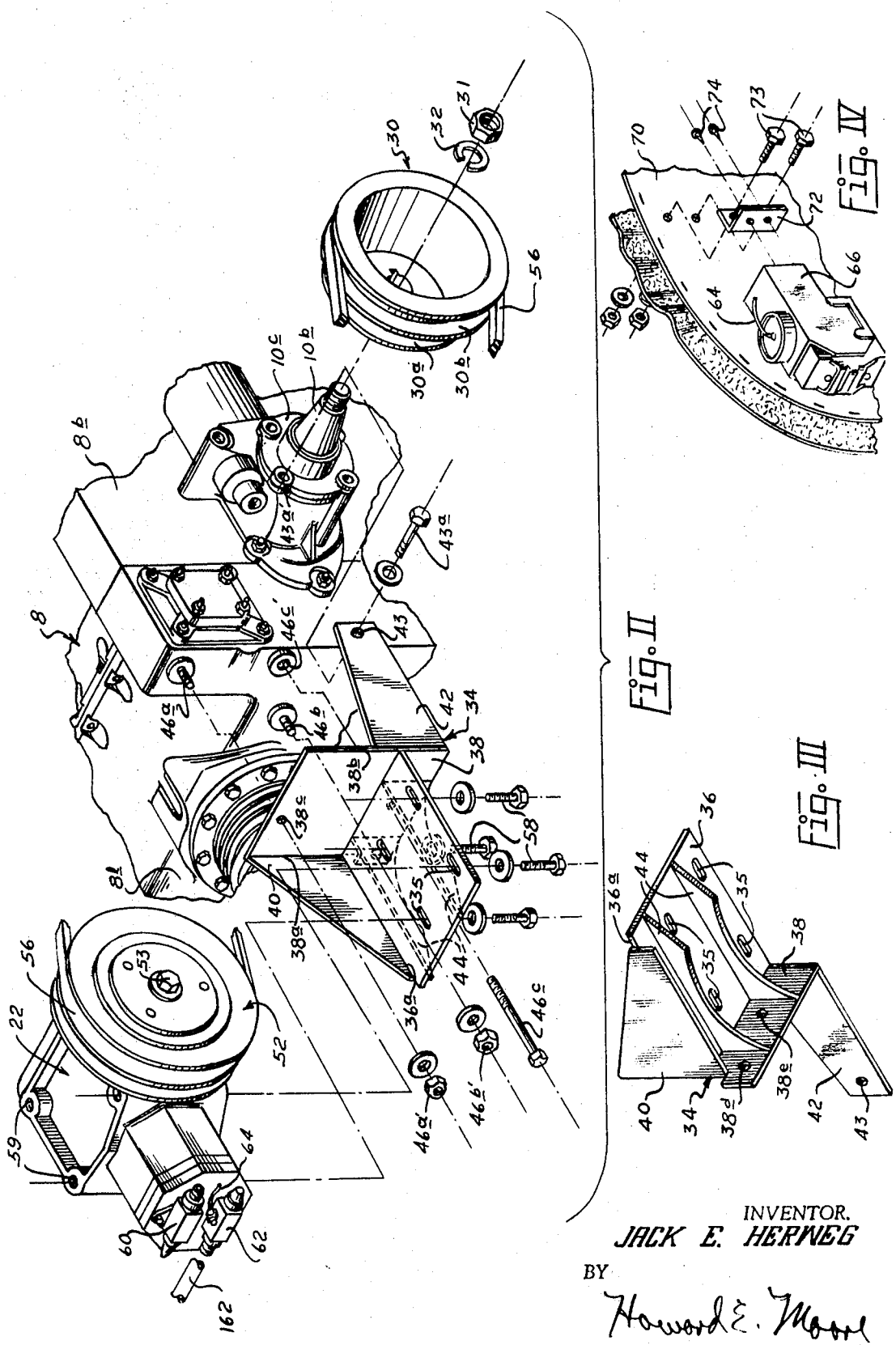

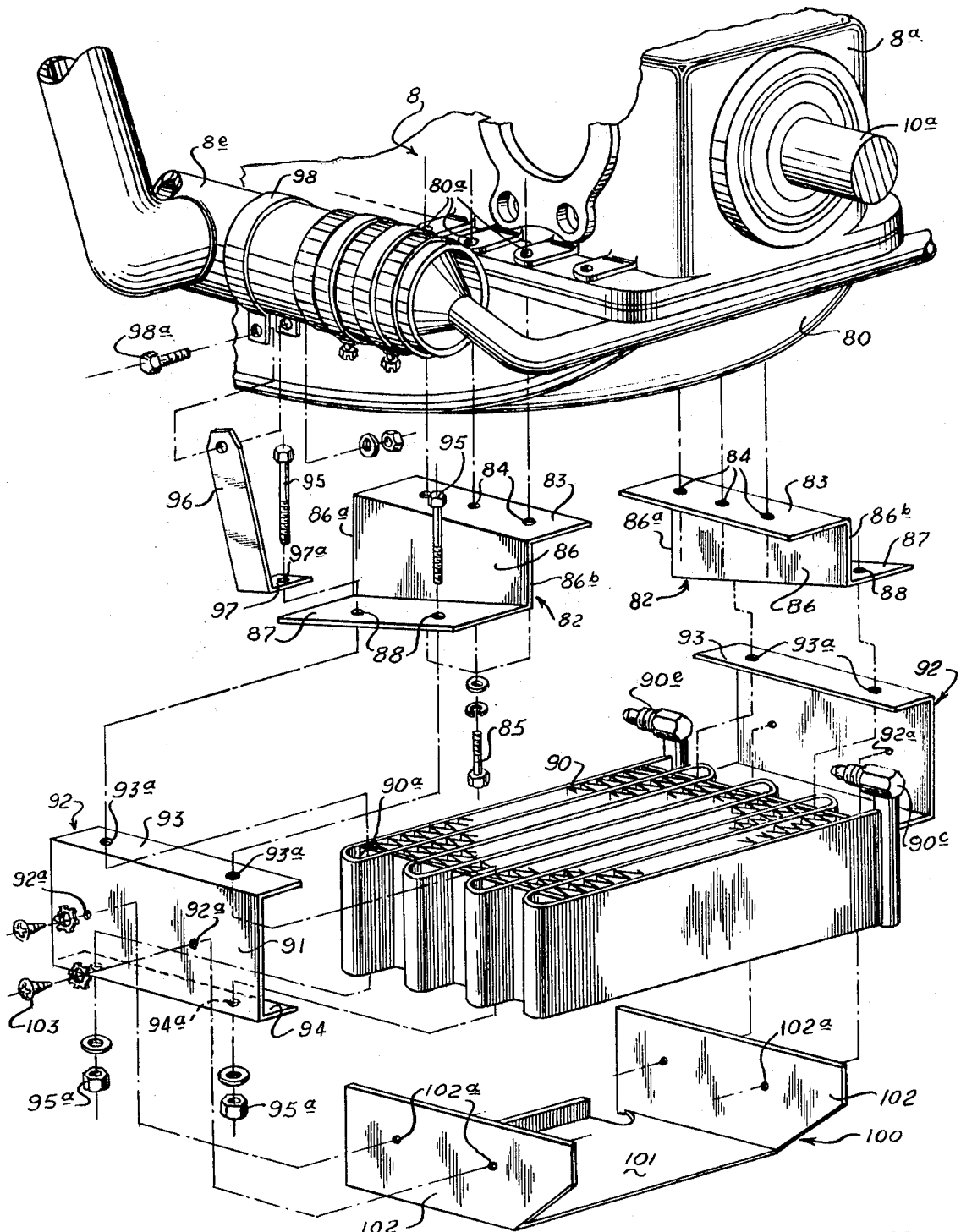

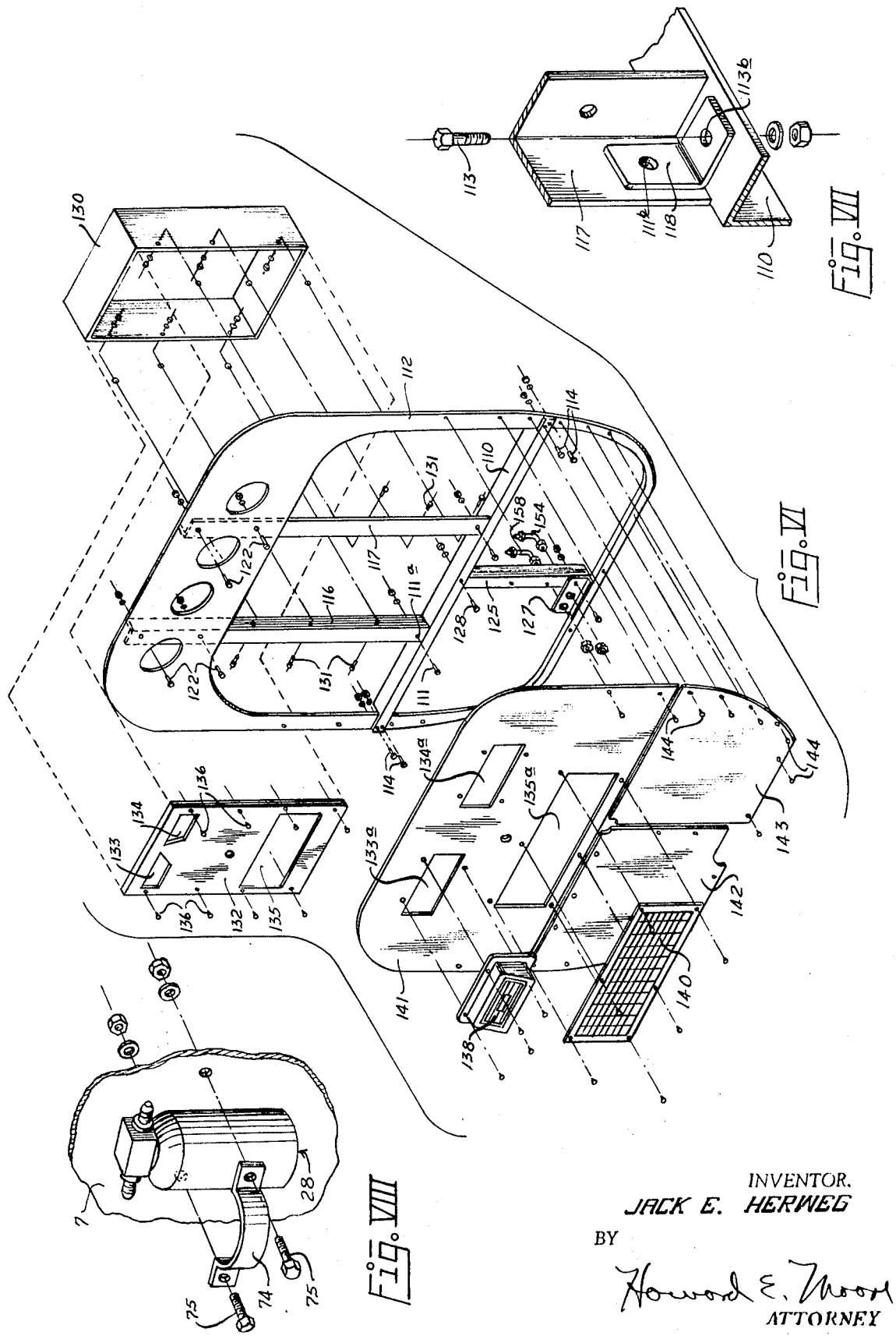

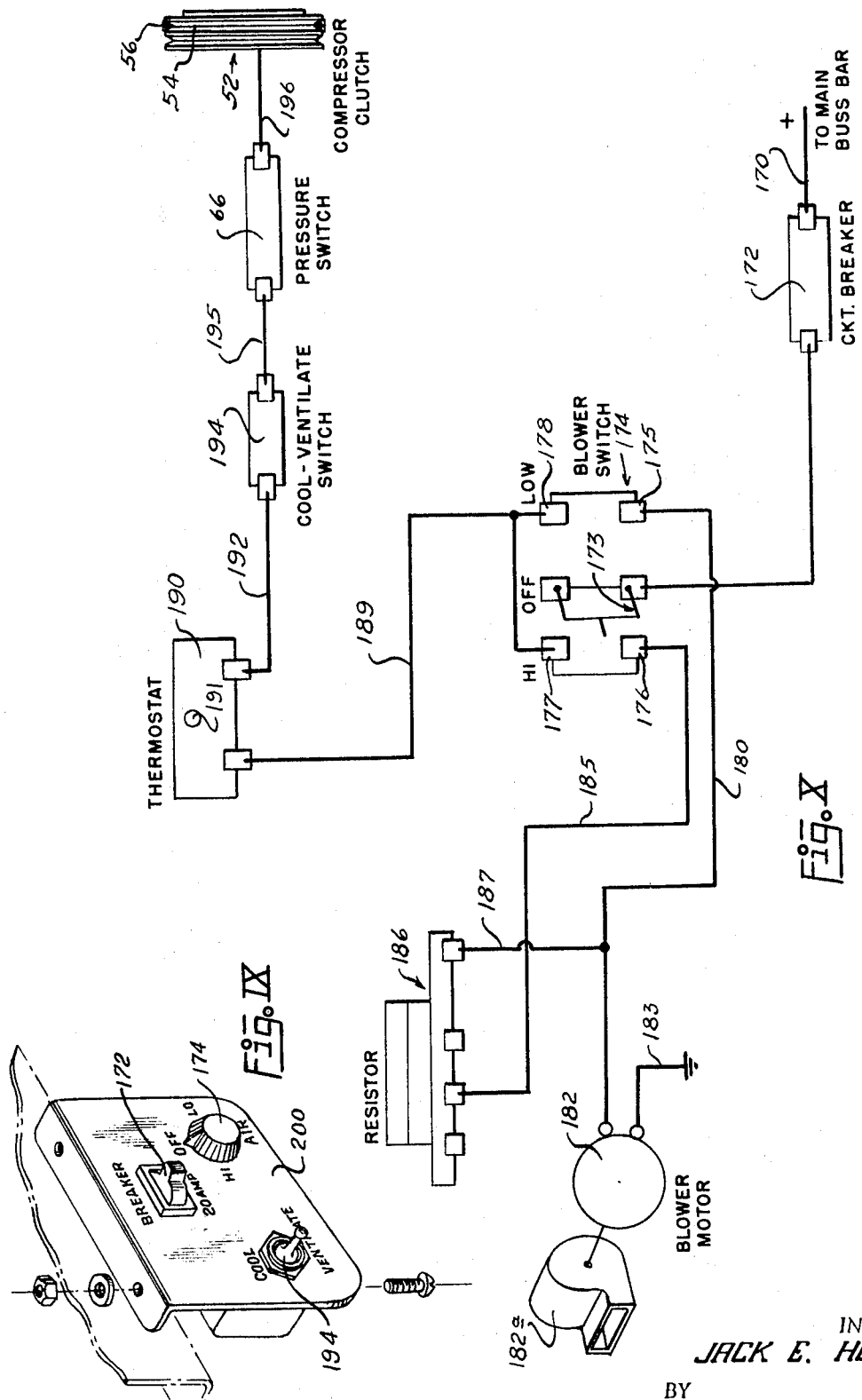

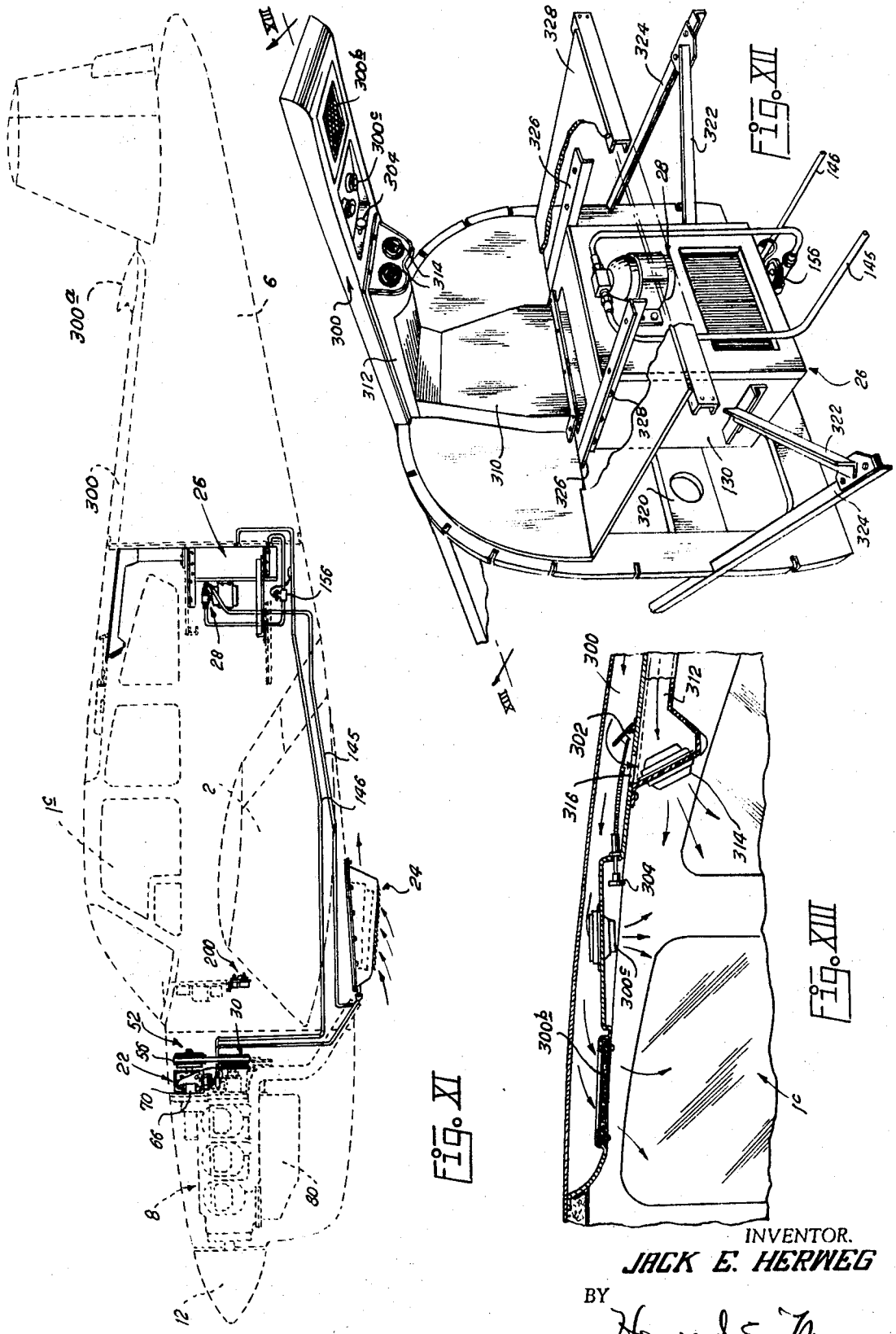

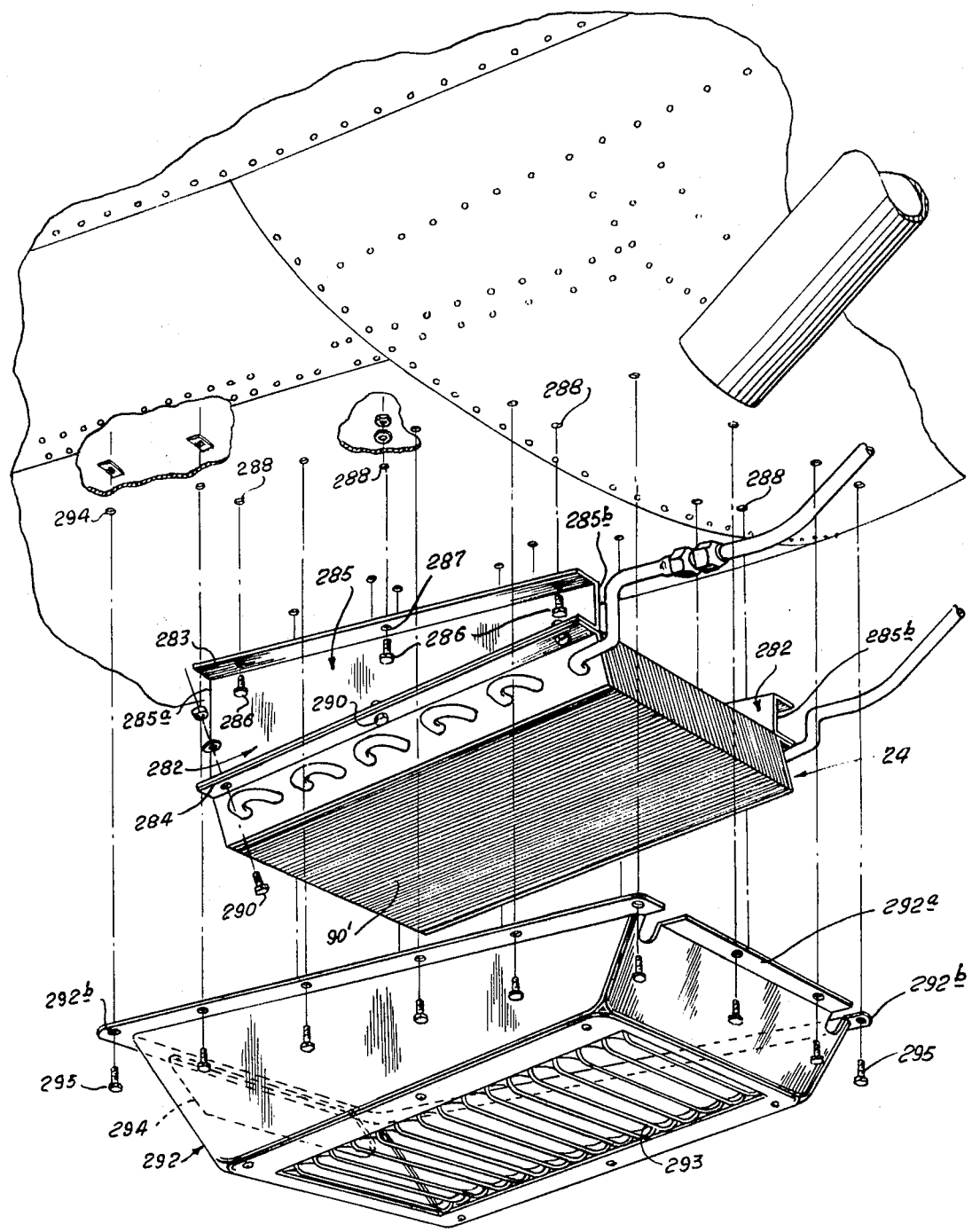
Fig. XIV
INVENTOR.
JACK E. HERWEG
BY Howard E. Moore
ATTORNEY

SINGLE-ENGINE AIRCRAFT AIR-CONDITIONING SYSTEM

BACKGROUND OF THE INVENTION

Primary considerations in aircraft design are weight and balance. The overall weight of an airplane together with the weight of passengers and cargo must be lifted by the aerodynamic reaction on the wing surface. The power of the engine is most effectively utilized for moving the plane when the weight of the plane is minimized. Small single-engine aircraft normally weighs less than 15 pounds per horsepower of the engine.

The position of the center of gravity of an aircraft is critical and must be maintained within certain limits if the aircraft is to fly safely. The position of the center of gravity of the aircraft affects the aerodynamic stability about three mutually perpendicular axis which extend longitudinally, horizontally and vertically through the center of gravity of the aircraft. The degree of stability of an aircraft is determinative of the extent of control a pilot has over the aircraft.

Heretofore attempts to air condition single-engine aircraft have failed because the stability and weight of the aircraft was materially altered by the installation of air-conditioning systems.

The Administrator of the Federal Aviation Agency is empowered by Congress to establish reasonable rules and regulations for registration and identification of aircraft engines, propellers and appliances in the interest of safety and no aircraft engine, propeller or appliance may be used in violation of any such rule or regulation.

Rules, regulations and minimum standards have also been established by the Federal Aviation Agency governing the inspection, servicing and overhaul of aircraft appliances in the interest of safety. Major repairs and alterations of aircraft must comply with the established regulations and must be approved by the Federal Aviation Agency.

Heretofore, no air-conditioning system for a single-engine aircraft had been approved by the Federal Aviation Agency. However, the installation of the air-conditioning system hereinafter described in accordance with the installation instructions included herein in the description of preferred embodiment of my invention has been approved by the Federal Aviation Agency and aircraft having same installed therein have been certified as meeting the air worthiness requirements of Part 3 of the Civil Air Regulations.

SUMMARY OF INVENTION

I have developed a single-engine aircraft air-conditioning system which may be installed in an aircraft without adversely effecting the aerodynamic characteristics or the structural strength of the aircraft.

A specially designed compressor mounting bracket is utilized for securing a compressor to the aircraft engine and a condenser is secured to the fuselage or to the lower side of the engine positioned so that air currents created by prop blast are directed thereacross. An evaporator and blower are mounted in the fuselage to direct cool air through the cabin of the aircraft.

The components of the air-conditioning system are positioned relative to the center of gravity of the aircraft such that there is no appreciable change in the center of gravity of the aircraft and consequently stability of the aircraft is not effected.

It is a primary object of the present invention to provide an air-conditioning system for a single engine aircraft which may be installed without alteration of the structural components of the craft.

Another object of the invention is to provide an air-conditioning system for single-engine aircrafts which may be installed without appreciable effect upon stability and handling of the aircraft.

Another object of the invention is to provide an air-conditioning system for single-engine aircraft which may be installed without departing from the air worthiness requirements of Federal Aviation Agency regulations.

A further object of the invention is to provide an air-conditioning system for single-engine aircraft wherein the condenser is positioned to facilitate cooling of refrigerant circulated therethrough by the prop blast of the aircraft.

A further object of the invention is to provide an air-conditioning system for single-engine aircraft which may be installed within the fuselage thereof creating no appreciable parasitic drag.

A still further object of the invention is to provide an air-conditioning system for single-engine aircraft wherein the compressor is controlled by a pressure switch whereby the air conditioning system will be turned off when maximum power is required.

Other and further objects of the invention will become apparent upon reading the detailed specification hereinafter following and by referring to the drawings annexed hereto.

DESCRIPTION OF THE DRAWING

Drawings of a preferred embodiment of the invention are annexed hereto so that the invention may be better and more fully understood, in which.

Figure 1:
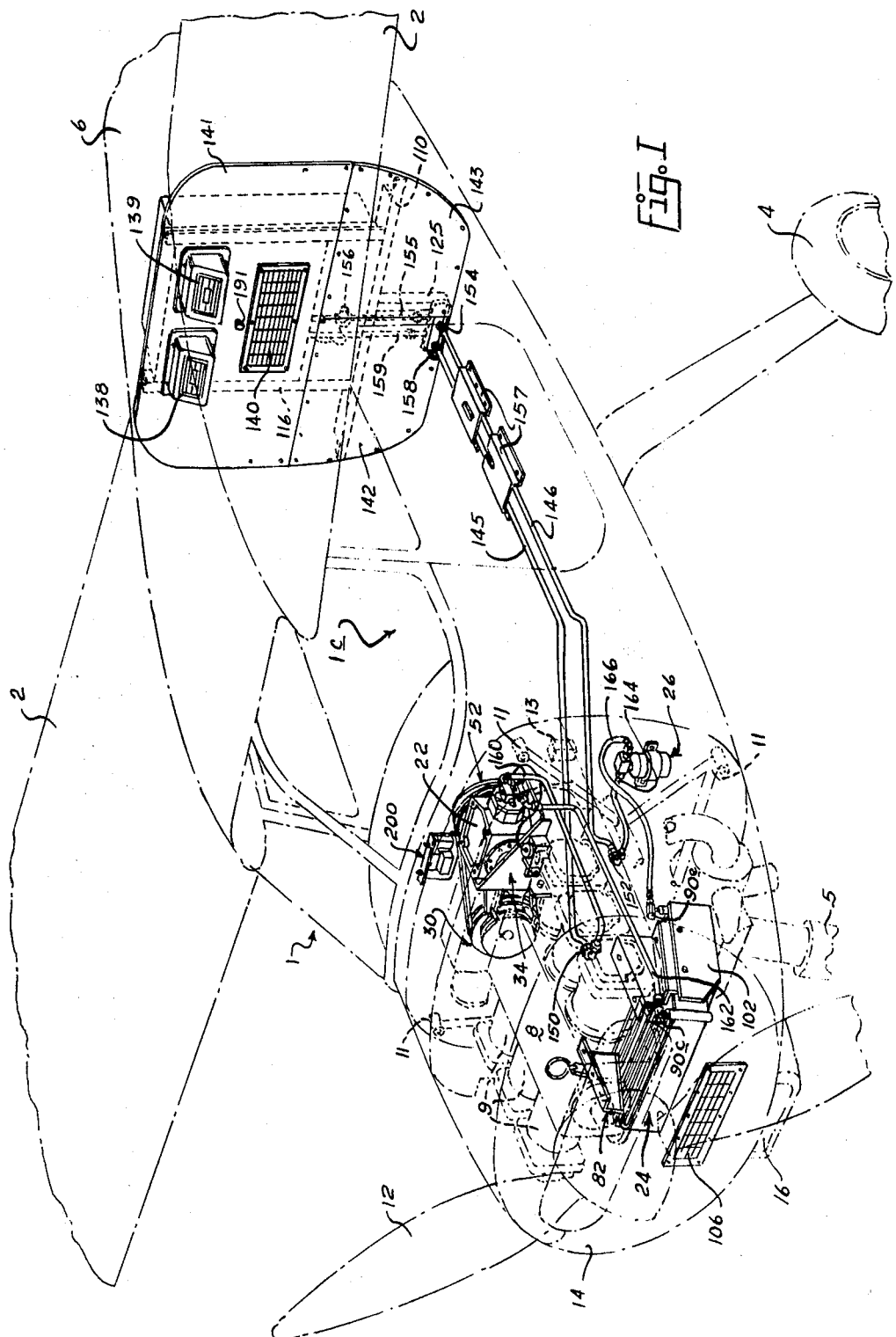
FIG. 1 is a fragmentary perspective view of a single-engine aircraft (shown in dot-dash lines) with an air-conditioning system (shown in full lines) mounted therein.

FIG. II is an exploded perspective view of the rear of an airplane engine illustrating the installation of the compressor-mounting bracket and drive pulley thereon;

FIG. III is a perspective view of the compressor-mounting bracket;

FIG. IV is an exploded perspective view illustrating the installation of a pressure switch on the engine baffle;

FIG. V is an exploded perspective view of the front of an aircraft engine illustrating the installation of a condenser on a lower portion thereof;

FIG. VI is an exploded perspective view of a bulkhead behind the baggage compartment of an aircraft illustrating details of installation of an evaporator therein;

FIG. VII is an enlarged fragmentary perspective view of a connection between mounting brackets for supporting the evaporator;

FIG. VIII is an exploded perspective view illustrating details of the installation of the receiver-dryer on the fire wall;

FIG. IX is a perspective view of a switch panel mounted on the instrument panel of the aircraft for controlling the air-conditioning system;

FIG. X is a wiring diagram of the electrical circuit;

FIG. XI is a side elevational view of a modified form of the invention with an air-conditioning system (shown in full lines) mounted in a single-engine aircraft (shown in dashed lines);

FIG. XII is a fragmentary perspective view of the evaporator mounting employed in the modified form of the invention;

FIG. XIII is an enlarged cross-sectional view taken substantially along lines XIII–XIII of FIG. XII; and FIG. XIV is an exploded perspective view illustrating the installation of the condenser on the fuselage of an aircraft.

Numeral references are employed to indicate the various parts shown in the drawings and like numerals indicate like parts throughout the various figures of the drawings.

DESCRIPTION OF A PREFERRED EMBODIMENT

Referring to FIG. I of the drawing, the numeral 1 generally designates a conventional single-engine aircraft having wings 2 and an undercarriage consisting of main wheels 4 and nose wheel landing gear 5 connected to a fuselage 6. The conventional components of the aircraft 1 are shown in dot-dash outlines while the components of the air-conditioning system comprising the present invention are shown in full lines.

The particular aircraft 1 illustrated in the drawing is powered by a six-cylinder, air-cooled, horizontally opposed engine 8 having a crankshaft 10 which has a front end 10a extending forwardly of the front end 8a of the engine and the back end 10b thereof extends rearwardly of the back end 8b of the engine. A propeller 12 is rigidly connected to the front end 10a of crankshaft 10 for moving the aircraft. The engine 8 can be replaced with other aeronautical engines and details of construction are merely illustrative.

The engine 8 is enclosed in a cowl 14 to streamline the aircraft and to protect the engine. An airscoop 16 is provided in the lower portion of the cowl to direct a cooling air stream across cylinders 9 of the engine 8.

The particular aircraft 1, illustrated in FIGS. I—X of the drawing, is a "Cessna Model 182" equipped with a Continental engine. The aircraft 1', illustrated in FIGS. XI—XIV of the drawing, is a "Beechcraft." These particular aircraft are well known to persons having ordinary skill in the art and further description of the details thereof is not deemed necessary.

My invention comprises the air-conditioning system shown in full outlines in FIG. I and FIG. XI, the components thereof illustrated in the position they would occupy installed in the particular aircraft hereinbefore described.

The air-conditioning system consists of four basic components, a compressor 22, condenser 24, an evaporator 26 and a receiver-dryer 28, together with fluid conductors and electrical systems associated therewith. The basic components of the air-conditioning system are conventional and are of the type commonly utilized in air-conditioning systems for automobiles.

The specific compressor shown in the drawing is a "York 206" driven through a 12-volt "Electro-Lock" clutch. Any compressor and clutch of comparable size, weight and capacity may be substituted in lieu thereof.

Specifications of the compressor are stated in York Service Manual, Automotive Air-Conditioning Compressors Series 66 and Series 67, Form 180.32–NM coded 166, distributed by York Corporation of York, Pennsylvania, subsidiary of Borg-Warner.

The compressor has two cylinders, 1.875-inch bore, 1.105-inch stroke, and 6.11 cubic inch displacement. The weight of the compressor, including the clutch and mounting bracket, is approximately 20 pounds and is installed in a Cessna substantially at "station −6.0" on the left upper rear side of the engine case between the engine baffle assembly and the firewall as will be hereinafter more fully explained. It should be appreciated that locations and station numbers may be varied to most efficiently balance the overall system in an aircraft.

So that the invention may be better and more fully understood the parts of the air-conditioning system will be described in conjunction with a description of the steps to be followed to install the air-conditioning system in the aircraft.

To install compressor 24, the cowl 14 of the aircraft must be removed to provide access to engine 8.

Referring to FIG. II of the drawing, the rear end 10b of crankshaft 10 which normally extends rearwardly of engine 8 has a single sheave generator drive pulley secured thereto for driving a generator belt to drive a generator for providing current to the electrical system of the aircraft. To install compressor 22 the generator belt and generator drive pulley (not shown) are removed and a double pulley 30 is mounted on the end 10b of crankshaft 10 by a nut 31 and lock washer 32. The generator drive pulley may be removed and the double pulley 30 mounted in lieu thereof either by loosening engine mounts and lowering the engine 8 slightly or by removing the starter adapter assembly.

A compressor-mounting bracket 34, best illustrated in FIGS. II and III, is provided for mounting the compressor 22 upon engine 8. The compressor-mounting bracket 34 is composed of a bearing plate 36 welded or otherwise rigidly secured intermediate the opposite ends of a mounting plate 38. A sideplate 40 is welded or otherwise rigidly secured to the forward edges 36a and 38a of bearing plate 36 and mounting plate 38 respectively, forming a strong rigid bracket in which compressor 22 may be mounted. An arm 42 is welded or otherwise rigidly secured to the lower portion of the rear edge 38b of mounting plate 38 and extends rearwardly thereof having a hole 43 formed therein for receiving the bolt 43a as will be hereinafter more fully explained.

Ribs 44 are welded or otherwise rigidly secured to the lower face of bearing plate 36 and to a lower portion of mounting plate 38. Sideplate 40, ribs 44 and arm 42 are provided to structurally reinforce plates 36 and 38 so that they may be constructed of lightweight material while providing structural strength and rigidity to support the compressor when it is placed in other than the normal horizontal position and when subjected to accelerations as may be experienced during acrobatic flying.

Bearing plate 36 has elongated openings 35 extending therethrough in spaced-apart relation and mounting plate 38 has an aperture 38c formed adjacent the upper edge thereof between edges 38a and 38b. Apertures 38d and 38e are formed adjacent the lower edge of mounting plate 38 to facilitate connecting the bracket 34 to engine 8 as will be hereinafter more fully explained.

Aircraft engines are lightweight castings of special alloy metals, cast and machined in segments and secured together by engine assembly bolts to form an engine block.

Mounting bracket 34 is attached to the upper left rear of the engine case using existing engine assembly bolts 46a, 46b and 46c which are received by apertures 38c, 38d and 38e respectively. Bolts 46a and 46b are studs and bracket 34 is secured thereto by nuts 46a' and 46b'. Threaded bolt 46c is secured in a threaded hole 46c' in the engine casing.

A bolt 43a extends through aperture 43 in arm 42 and is threadedly secured in threaded hole 43a' in a flange on the bearing housing 10c behind the rear 8b of engine casing.

After the compressor-mounting bracket 34 has been rigidly secured to the engine casing, compressor 22, driven by a positive drive means and having a conventional electrically actuated clutch 52 secured to the drive shaft thereof by a bolt 53, is positioned in the bracket. Clutch 52 has a sheave 54 thereon for receiving a compressor drive belt 56.

Compressor 22 is secured to bearing plate 36 of compressor mounting bracket 34 by bolts 58 which extend through elongated openings 35 in the bearing plate and threadedly engage threaded holes 59 which extend through the bottom of compressor 22.

Compressor 22 has a suction valve 60 and a discharge valve 62 connectable to conduits 160 and 162 such that fluid from the evaporator 26 is compressed and discharged to the condenser 24 as will be hereinafter more fully explained.

One end of capillary line 64 communicates with the inside of discharge service valve 62 and the other end thereof is connectable to the pressure safety switch 66 secured to the engine baffle 70 by an angle bracket 72, bolts 73 and screws 74, best illustrated in FIG. IV.

After compressor 22 and double pulley 30 have been installed, the generator belt may be replaced around sheave 30a and around the generator pulley, and compressor drive belt 56 is positioned around sheave 30b on the double pulley and sheave 54 on the compressor clutch pulley 54. Tension in compressor drive belt 56 may be adjusted prior to tightening bolts 58 in slotted openings 35 in the compressor-mounting bracket 34.

It should be noted that the installation of compressor 22 and double pulley 30 is accomplished without any substantial modification of the aircraft. Replacement of a single pulley with the double pulley 30 is the only modification of the engine. The only other modification required for installing the compressor involves relocating the hole in the firewall through which the throttle control cable passes downwardly about 8 inches. Some installations may require relocation of the voltage regulator 13 on the firewall 7 of the aircraft.

Referring to FIGS. I and VIII, receiver 28 is mounted on firewall 7 of the aircraft between the lower left motor mount 11 and voltage regulator 13 and is secured thereby by a clamp 74 and bolts 75.

The specific receiver 28 illustrated in FIGS. I—X of the drawing weighs approximately 12 pounds and is mounted substantially at "station −7.0." The receiver 28 may be secured to the evaporator 26 as illustrated in FIGS. XI and XII to minimize change in the center of gravity of a specific aircraft. It should be appreciated that the sum of the moments of the components of the system is to be maintained as near zero as possible without modification of the aircraft structure.

Condenser 24, FIGS. I and V, is mounted below the oil pan 80 adjacent the front end 8a of engine 8.

Condenser-mounting brackets 82 are provided with inwardly directed flanges 83 having bolt holes 84 formed therein arranged to coincide with holes 80a in the pan 80 and engine 8 for receiving pan bolts 85 which normally secure the pan to the lower engine casing. Mounting bracket 82 has a downwardly extending portion 86 having its upper end rigidly connected to the outer edge of flange 83 and an out-turned flange 87 has its inner edge rigidly connected to the lower edge thereof. The rear edge 86a of the downwardly extending portion 86 is longer than the front edge 86b, allowing condenser coils 90 to be cradled in an inclined position below engine 8 as will be hereinafter more fully explained. Flange 87 has spaced holes 88 disposed in spaced-apart relation through a central portion thereof.

Condenser-mounting braces 92 are channel-shaped members having inturned flanges 93 and 94 at the upper and lower ends of a vertical web 91.

After condenser-mounting brackets 82 have been secured to engine 8 by pan bolts 85, condenser braces 92 are positioned around opposite ends of condenser coil 90 with upper flange 93 being positioned above the upper edge of the coils and flange 94 being positioned below the lower edge of the coils.

Bolts 95 are inserted through holes 88 in flange 87 of brackets 82 and extend through holes 93a in the upper flange 93 of brace 92, through holes 90a at opposite ends of condenser coil 90, through holes 94a in flange 94 and are secured therein by a nut 95a secured to the lower end thereof.

A lateral condenser brace 96, consisting of a strap having an inturned portion 97 at the lower end thereof with a hole 97a passing through a central portion thereof, is secured to one of the pan bolts 95 and by a bolt 98a to a clamp 98 which encircles a portion of exhaust manifold 8e on engine 8.

An airscoop 100 has a relatively flat lower portion 101 and upturned flanges 102 at each end thereof with holes 102a passing therethrough, allowing the airscoop 100 to be secured to condenser braces 92 by screws 103 extending through holes 92a in the web 91 of each condenser brace 92.

A passage is formed in the front of cowl 14 and a grill 106, best illustrated in FIG. I, is riveted thereover forming a passage through which air currents may travel for cooling refrigerant in condenser 24. It should be noted that grill 106 is positioned immediately behind propeller 12 such that a large volume of air will be delivered to condenser 24.

From the foregoing it should be readily apparent that condenser coils 90 are rigidly connected in an inclined position below the front end of engine 8 in such a position as to receive the large volume of air as a result of prop blast through grill 106.

The installation of the condenser 24 does not require the removal or relocation of any standard part of the aircraft except for cutting a passageway in cowl 14 for installation of grill 106. It should also be noted that compressor 22, condenser 24 and receiver 28 are mounted forward of fire wall 7, in front of the cabin 1c of the aircraft 1, and therefor forward of the center of gravity of the aircraft.

The specific condenser described herein weighs approximately 7.5 pounds and is installed substantially at "station −28.0." An alternate method of mounting the condenser is hereinafter described.

The evaporator 26, FIGS. I, VI and VII, is mounted behind the cabin 1c of the aircraft and is, therefore, positioned on the opposite side of the center of gravity of the aircraft to balance the moment created by the installation of compressor 22, condenser 24 and receiver 28.

To install evaporator 26, the rear baggage compartment panels and the baggage shelf of a conventional airplane are removed, and suitable support means is mounted in the bulkhead behind the baggage compartment. For installation of the evaporator 26 in a "Cessna 182" the support means is mounted in "station 108 bulkhead."

In the particular embodiment of the invention illustrated in the drawing, a horizontal mounting bracket 110 is secured to bulkhead 112 by bolts 114. Upright angle brackets 116 and 117 are connected to the horizontal bracket 110 by bolts 111 and 113 extending through holes 111b and 113b in angle 118 which are in alignment with holes 111a and 113a extending through horizontal brace 110 and vertical braces 116 and 117. The upper ends of vertical brackets 116 and 117 are secured to an upper portion of bulkhead 112 by bolts 122.

A post 125 is bolted or otherwise rigidly connected to a bulkhead plate 127 which is rigidly secured to a central portion of the lower edge of bulkhead 112. The upper end of post 125 is connected by a bolt 128 to the central portion of horizontal bracket 110.

An evaporator case 130 is mounted between vertical mounting brackets 116 and 117 and has its opposite sides secured thereto by bolts 131.

The evaporator should weigh approximately 12 pounds and the center of gravity thereof is positioned substantially at "station +111."

After evaporator case 130 has been secured to mounting brackets 116, 117 and 110 a conventional evaporator is installed therein in a conventional manner and evaporator face plate 132 having openings 133, 134 and 135 formed therein is connected to case 130 by screws 136. Grills 138, 139 and 140 are secured over passages 133, 134 and 135 in face plate 132 and over passages 133a, 134a and 135a respectively in rear baggage compartment panels 141, 142 and 143.

After installing conduits 145 and 146, as will be hereinafter more fully explained, baggage compartment panels 141, 142 and 143 will be secured to bulkhead 112 by screws 144.

Suitable conduits are provided for joining the major components of the air conditioning system for circulating refrigerant therethrough.

Two holes are drilled in spaced-apart relation in a central portion of fire wall 7 and fittings 150 and 152 are secured therein, FIG. I. One end of conduit 146 is connected to fitting 152 and the other end thereof is connected to a fitting 154 which is connectable through line 155 and expansion valve 156 to the evaporator. One end of suction line or conduit 145 is connected to fitting 150 and the other end thereof is connected through a suitable coupling 158 which is connectable through line 159 to the evaporator.

Tubing covers 157 are provided for securing conduits 145 and 146 to the floor of the cabin 1c of the aircraft. One end of conduit 160 is connected to fitting 150 and the other end thereof is connected to the compressor suction service valve 60. Conduit 162 extends between the compressor discharge service valve 62 and fitting 90c on one end of condenser coils 90.

Fitting 152 is connected through conduit 164 to the inlet port of receiver 28. The outlet port of receiver 28 is connected through conduit 166 to the inlet port 90e of condenser coils 90.

As hereinbefore pointed out, capillary line 64 extends between compressor discharge service valve 62 and pressure switch 66 which is secured to the engine baffle 70 (FIGS. II and IV).

The electrical system for controlling the air-conditioning system is illustrated in FIG. X. Line 170 is connected to the main buss bar of the electrical system of the aircraft and has a conventional circuit breaker 172 provided therein. Line 170 carries current to the movable pole 173 of blower switch 174. Blower switch 174 is a conventional double-pole double-throw switch having a contact 175 connected through line 180 to blower motor 182 disposed within evaporator case 130 connected to a conventional blower 182a for forcing air across the evaporator coils through grills 138 and 139 into the cabin 1c of the aircraft. The other side of the windings of motor 182 is connected through line 183 to ground. Contact 176 of blower switch 174 is connected through line 185, through a resistor 186, and line 187 to line 180 which is connected to one side of the winding of motor 182 as hereinbefore explained. Contacts 177 and 178 of blower switch 174 are connected through line 189, thermostatically controlled switch 190 having control knob 191, line 192, single pole double throw switch 194, line 195, pressure switch 66 and line 196 to electrically actuate clutch 52.

From the foregoing it should be readily apparent that switch 174 may be manipulated to turn blower motor 182 on high or low speed while delivering current through line 189 to energize clutch 52 of compressor 22. If it is desired to circulate air through the cabin 1c without running compressor 22, switch 194 may be opened to disengage the compressor clutch 52 while leaving blower motor 182 in the energized condition.

Blower switch 174, cool-ventilate switch 194 and circuit breaker 172 may be mounted on a suitable switch panel 200 on the instrument panel of the aircraft.

DESCRIPTION OF A SECOND EMBODIMENT

The particular aircraft illustrated in FIGS. XI through XIV is commonly referred to as a "Beechcraft."

The individual components of the air-conditioning system, compressor 22, condenser 24, evaporator 26 and receiver 28, are the same as hereinbefore described. However, the specific location of some of the components has been changed to facilitate installation of the air-conditioning system in the particular aircraft without changing the aerodynamic characteristics or structural strength of the aircraft.

Compressor 22, secured to mounting bracket 34, is attached to the upper right rear engine crankcase between engine baffle 70 and the firewall.

Referring to FIGS. XI and XIV, condenser 24 is attached to the lower forward section of the fuselage of the aircraft. Condenser-mounting brackets 282 are provided with outwardly directed flanges 283 and 284 secured to the upper and lower edges respectively of web portion 285. The rear edge 285a of web portion 285 is longer than front edge 285b. Mounting brackets 282 are secured to the lower side of the fuselage by bolts 286 which extend through apertures 287 in upper flange 283 and apertures 288 in the skin of the aircraft.

Condenser coils 90' are secured to lower flange 284 of mounting bracket 282 by bolts 290.

A fairing shroud 292 has louvers 293 in the under side thereof to direct air currents created by prop blast through condenser coils 90'. The air leaves the shroud 292 through outlet 294 in the rear surface thereof. Shroud 292 has outturned flanges 292a, having apertures 292b extending therethrough, for receiving bolts 295 which extend through apertures 294 in the skin of the aircraft for securing the shroud 292 thereto.

Fairing shroud 292 has a smooth symmetrical outline to minimize drag and is centered on the centerline of the aircraft.

It should be readily appreciated that condenser 24 is mounted in an inclined position in the airstream created by the propeller of the aircraft to effectively cool refrigerant circulated therethrough.

Referring to FIGS. XI, X(I and XIII, an air passage 300 having an inlet 300a on the outer surface of the fuselage of the aircraft and outlet passages 300b and 300c on the inside of the aircraft allows fresh air to circulate therethrough into the cabin 1c of the aircraft. A baffle 302 is manipulated through a control know 304 to open and close passage 300.

Evaporator 26 and blower 182a are mounted in evaporator housing 130. Blower 182a discharges air through ducts 310 and 312 to outlets 314 communicating with the inside of cabin 1c of the aircraft. An aperture 316 extends through the upper wall of duct 312 and communicates with passage 300.

It should be readily apparent that air from cabin 1c may be circulated through evaporator 26 causing cool air to be discharged from outlets 114. If it is desired to mix fresh air from outside the cabin with refrigerated air circulating through the cabin, control knob 304 may be manipulated to open baffle 302 allowing fresh air in regulated quantities to be mixed with the refrigerated air.

Evaporator housing 130 is bolted or otherwise rigidly secured to a cross brace 320 which extends transversely across the aircraft and is secured to the bulkhead. Angle braces 322 extend between evaporator cabinet 130 and side stringers 324. Angle braces 322, in the particular installation in a Beechcraft, are anchored to side stringers 324 behind "station 151.0."

An angle frame 326 is bolted or otherwise secured to the under side of shelf 328 and is secured to the upper end of evaporator housing 130 by screws 328.

In the particular embodiment of the invention illustrated in FIGS. XI and XII of the drawing, receiver 28 is secured to evaporator case 130.

From the foregoing it should be readily apparent that I have developed an air-conditioning system for a single engine aircraft comprising conventional inexpensive automobile air conditioning components which may be installed in an aircraft without effecting the stability thereof. The components of the air-conditioning system may be installed, as hereinbefore explained, without cutting or relocating structural members in the airframe of the aircraft.

While it may be necessary to displace some of the components from specific positions hereinbefore described for installation in specific types of aircraft, the lightweight decentralized components may be positioned relative to the center of gravity of the aircraft is substantially unchanged as a result of the installation.

In the foregoing description, the invention has been described with reference to certain particular preferred embodiments, although it is to be understood that the specific details shown are merely illustrative and that the invention may be carried out in other ways without departing from the true spirit and scope of the following appended claims.

Having described my invention I claim:

1. In an air-conditioning system for a single-engine propellor-driven airplane having a fuselage, a cabin in the fuselage, an engine in the nose of the fuselage positioned centrally between wing tips of the airplane, a firewall between the cabin and the engine, and a bulkhead behind the cabin, said airplane having a center of gravity, said system comprising, a compressor; means for securing the compressor adjacent the engine and forward of the center of gravity of the airplane; positive power transmission means between the compressor and the engine for driving the compressor; a condenser; means for securing the condenser to a forward portion of the airplane downstream of the aircraft propeller; means adapted to direct air from the propeller across the condenser within a streamlined housing; a receiver; means for mounting the receiver in the airplane; an evaporator assembly having a housing with an air intake opening and an air discharge opening therein providing a passage through the housing communicating with the cabin; said evaporator including a coil and air-circulating means adapted to circulate air from and to the inside of the cabin through the passage and over the coil to cool the air; means for securing the evaporator housing to the bulkhead behind the cabin and rearwardly of the center of gravity; conduit means connecting the compressor, condenser, receiver and evaporator; refrigerant in the conduit means; and an expansion valve in the conduit means, said compressor, condenser, receiver, and evaporator being positioned relative to the center of gravity of the airplane so as not to materially change the center of gravity when installed.

2. The combination called for in claim 1 wherein the means for securing the compressor adjacent the engine includes a bracket so constructed and arranged that it is connectable to the compressor and the engine.

3. The combination called for in claim 2 wherein the engine consists of a block having segmented portions secured together by engine assembly bolts, and the compressor-mounting bracket comprises a mounting plate having spaced holes therein arranged to conform with the spacing of the engine assembly bolts, a bearing plate extending outwardly from a central portion of the mounting plate, an arm extending rearwardly of the mounting plate, means for securing the arm to the engine; and means for rigidly securing the bearing plate to the mounting plate.

4. The combination called for in claim 1 wherein the engine has a crankcase and an oil pan secured to a lower portion of the crankcase by pan bolts, and wherein the means for securing the condenser to a forward portion of the airplane comprises spaced brackets with openings therein arranged to coincide with the pan bolts such that the pan bolts extend through the openings to secure the brackets and the oil pan to the crankcase of the engine; and means for connecting the condenser to the brackets.

5. The combination called for in claim 1 wherein the means for securing the condenser to a forward portion of the airplane includes means for mounting the condenser on the outside of the fuselage centrally between wing tips of the airplane.

6. The combination called for in claim 4 wherein the means to direct air across the condenser includes an air scoop connected to the channel members below the condenser and directed toward the front of the airplane; and an opening in the front of the fuselage in alignment with the opening in the scoop to direct air passing through the plane propeller over the condenser.

7. The combination called for in claim 1 wherein the means for securing the condenser to a forward portion of the airplane comprises bracket members constructed and arranged to support the condenser in an air stream produced by propulsion of the airplane through the air.

8. The combination called for in claim 1 wherein the means for securing the evaporator to the bulkhead behind the cabin includes: a horizontal member having its opposite ends secured to opposite sides of the bulkhead; upright members having their lower ends secured in spaced-apart relation to a central portion of the horizontal member and having their upper ends secured to an upper portion of the bulkhead; a case secured between the upright members and supported by the horizontal member, and the evaporator being mounted in the case; and a face plate secured to the case in front of the evaporator, and the inlet opening and the discharge opening are in the face plate.

9. An air-conditioning system for a single-engine propeller-driven aircraft having a fuselage, a cabin in the fuselage, an engine in the nose of the fuselage, a firewall between the cabin and the engine, and a bulkhead behind the cabin, said system comprising, a compressor mounted to the rear portion of the engine; power transmission means between the engine and the compressor to drive the compressor; a condenser mounted behind the propeller and secured to the forward portion of the engine; passage means communicating with the outside of the fuselage to convey air over the condenser; a receiver mounted adjacent the engine; an evaporator assembly mounted on the rear of the bulkhead including a housing evaporator mounted in the housing, inlet and outlet passages through the bulkhead communicating with the housing, and air circulation means in the housing to circulate air through the inlet and outlet passages over the evaporator conduit means connecting the compressor, condenser, receiver and evaporator; an expansion valve in the conduit means; a refrigerant in the conduit; said components being distributed about the longitudinal and vertical axes of the aircraft so as not to materially change the center of gravity thereof when installed thereon.

10. The combination called for in claim 9 wherein the passage means includes an opening in the nose of the fuselage behind the propeller and the condenser comprises an elongated foraminous member mounted in inclined position with relation to the longitudinal axis of the aircraft to cause air entering through the opening to pass through the condenser.

11. The combination called for in claim 10 with the addition of a scoop underneath the condenser in line with the opening.

12. The combination called for in claim 9 with the addition of a scoop in the passage means arranged to direct air toward the condenser.

13. An air-conditioning system in a single-engine propellor-driven airplane comprising, a compressor; a receiver; a condenser mounted in a streamlined housing downstream of the propeller; an expansion valve; an evaporator; refrigerant lines connecting the compressor, receiver, condenser, expansion valve and evaporator; means to secure the compressor, receiver, condenser, and evaporator along the longitudinal axis of the airplane such that the center of gravity of the airplane before and after the system installation is in substantially the same location; a first driven member on the drive shaft of the airplane engine; second driven member on the compressor; and flexible drive means drivingly connecting the first and second members.

14. In air-conditioning system for a propeller driven airplane having a single engine in the nose thereof substantially centered between wingtips along the longitudinal axis of the airplane, and located forward of the center of gravity of the airplane, said system comprising a compressor; means to secure the compressor adjacent the engine; positive drive means between the engine and the compressor; a condenser mounted downstream of the propeller; means to secure the condenser to the airplane in a plane passing through the longitudinal axis of the airplane; an air scoop to direct air from the propeller through the condenser; an evaporator; means to mount the evaporator in the airplane rearwardly of the center of gravity thereof and substantially centered between the wingtips; a receiver; means to mount the receiver in the airplane; conduit means connected to the receiver, condenser, compressor, and evaporator; an expansion valve in the conduit means; and air circulating means adapted to circulate air across the evaporator and into the cabin of the airplane for cooling same.

UNITED STATES PATENT OFFICE

CERTIFICATE OF CORRECTION

Patent No. 3583658      Dated June 8, 1971

Inventor(s) Jack E. Herweg

It is certified that error appears in the above-identified patent and that said Letters Patent are hereby corrected as shown below:

Column 10, Line 3 after "housing" insert

--, an--

Column 10, Line 7 after evaporator insert

--;--

Signed and sealed this 28th day of September 1971

(SEAL)
Attest:

EDWARD M. FLETCHER, JR.
Attesting Officer

ROBERT GOTTSCHALK
Acting Commissioner of Patents